(12) United States Patent
Slabbert

(10) Patent No.: US 6,626,191 B1
(45) Date of Patent: Sep. 30, 2003

(54) METHOD AN APPARATUS FOR MAINTAINING HOUSED BEARINGS

(76) Inventor: David H Slabbert, 486 Mussouri Street, Fabrie Glen, Pretoria 0043, Gauteng Province (ZA)

(*) Notice: Subject to any disclaimer, the term of this patent is extended or adjusted under 35 U.S.C. 154(b) by 0 days.

(21) Appl. No.: 09/762,911

(22) PCT Filed: Aug. 11, 1999

(86) PCT No.: PCT/ZA99/00064

§ 371 (c)(1),
(2), (4) Date: Feb. 12, 2001

(87) PCT Pub. No.: WO00/09896

PCT Pub. Date: Feb. 24, 2000

(30) Foreign Application Priority Data

Aug. 11, 1998 (ZA) .............................. 98/4816

(51) Int. Cl.$^7$ .............................................. B08B 9/093
(52) U.S. Cl. ...................... 134/22.18; 134/42; 184/28; 384/624; 384/671
(58) Field of Search .................. 134/22.18, 42; 184/28, 105.1, 105.2; 384/624, 471

(56) References Cited

U.S. PATENT DOCUMENTS

| | | | | | |
|---|---|---|---|---|---|
| 2,950,943 | A | * | 8/1960 | Forrest | 184/13.1 |
| 2,959,457 | A | * | 11/1960 | Szymalak | 384/473 |
| 4,948,270 | A | * | 8/1990 | Minard et al. | 384/399 |
| 5,150,975 | A | * | 9/1992 | Major et al. | 384/465 |
| 6,089,758 | A | * | 7/2000 | Ward | 384/537 |
| 6,308,621 | B1 | * | 10/2001 | Douillard et al. | 101/216 |

* cited by examiner

Primary Examiner—Randy Gulakowski
Assistant Examiner—Saeed Chaudhry
(74) Attorney, Agent, or Firm—Darby & Darby

(57) ABSTRACT

This invention relates to an accessory for maintaining bearings, more particularly but not exclusively, to an accessory for use in the cleaning of bearings. The bearings maintenance accessory is used for the maintenance and cleaning of a bearing located on a shaft within a bearing house. The accessory consists of an annular manifold split into at least two parts. Each of the two parts has interlocking formations for releasably interlocking the parts together about a shaft. The manifold has an inlet in flow communication with an outlet through a flow passage for forcing a fluid through the manifold. A side of the manifold having the outlet is engageable against a face of a bearing house.

7 Claims, 3 Drawing Sheets

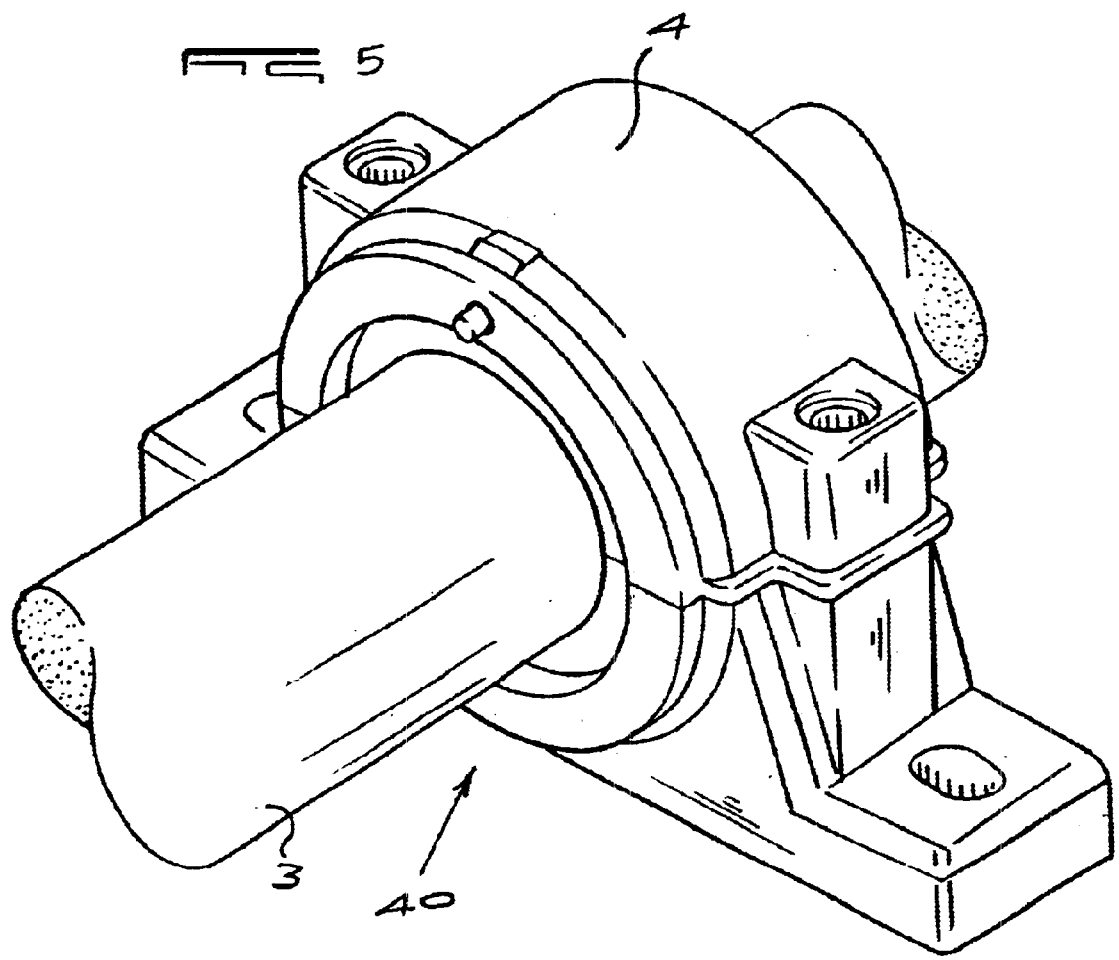

METHOD AN APPARATUS FOR MAINTAINING HOUSED BEARINGS

FIELD OF THE INVENTION

This invention relates to an accessory for maintaining bearings, more particularly, but not exclusively, to an accessory for use in the cleaning of bearings.

BACKGROUND TO THE INVENTION

Shafts which are rotatably secured in housings are, in most cases, supported on bearings located in the housing. These bearings are generally lubricated with a high temperature resistant grease. As bearings are normally sensitive to dirt and moisture, seals are secured in the housing over the shafts to protect the bearings.

Seals that are commonly used have varying degrees of success in preventing the Ingress of dirt. Also, the bearings themselves can wear giving off particles of metal which are trapped in the grease. It is thus desirable to clean the bearings at suitable intervals and the most common method of doing this is by dismantling part of the housing to expose the bearings which can then be cleaned with a solvent or other suitable fluid. This method of cleaning bearings is no only time consuming and costly In that machinery has to be stopped, and the housing dismantled, but also is not very effective as only parts of the bearings are usually exposed.

Another method includes the use of a annular plate which is used to replace the seal covers and has ports therein which allow a cleaning fluid to be projected therethrough onto the bearings. While fairly effective, use of such accessories is also problematical in that the shaft and housing have to be partially dismantled to allow the seals to be removed and the plate to be slid over the end of the bearing into engagement with the housing whereafter cleaning can commence.

OBJECT OF THE INVENTION

It is an object of this invention to provide a maintenance accessory for bearings which will at least partially alleviate some of the abovementioned problems.

SUMMARY OF THE INVENTION

According to this invention there is provided a bearing maintenance accessory for a bearing located on a shaft within a bearing housing comprising an annular manifold split Into at least two parts, the manifold having at least one inlet in flow communication with at least one outlet and interlocking formations enabling the two parts of the manifold to be releasably secured together about the shaft.

A further feature of the invention provides for the manifold to have engagement formations which are engageable with the bearing housing to hold the first side of the manifold having the outlet against a face of the housing.

Further features of this invention provide for the engagement formations on the manifold to include lugs which are spaced longitudinally from the manifold; for the lugs to be engageable In slots provided In the housing; for the engagement formations to further include resilient clips which are located on the side of the manifold having the outlet, and for the clips to be resiliently engageable in notches in the periphery of the housing.

The invention also provides for an inner periphery of the manifold to be grooved to form ribs which engage on the shaft.

The invention extends to a method of cleaning a set of bearings within a bearing housing comprising the steps of interlocking two parts of an annular manifold about a shaft, engaging the interlocked parts with bearing housing to hold the side of the manifold having an outlet against a face of the housing, and forcing a fluid into an Inlet of the manifold and out of the outlet into a set of bearings inside the housing.

These and other features of this invention will become apparent from the following description of one example illustrated in the accompanying drawings.

BRIEF DESCRIPTION OF THE DRAWINGS

A preferred embodiment of the invention is described below by way of example only and with reference to the accompanying drawings in which:

FIG. 5 shows a seal assembly engaged on a face of a bearing housing with which the bearing maintenance accessory can be conveniently used.

DETAILED DESCRIPTION OF THE DRAWINGS

Figure 1:
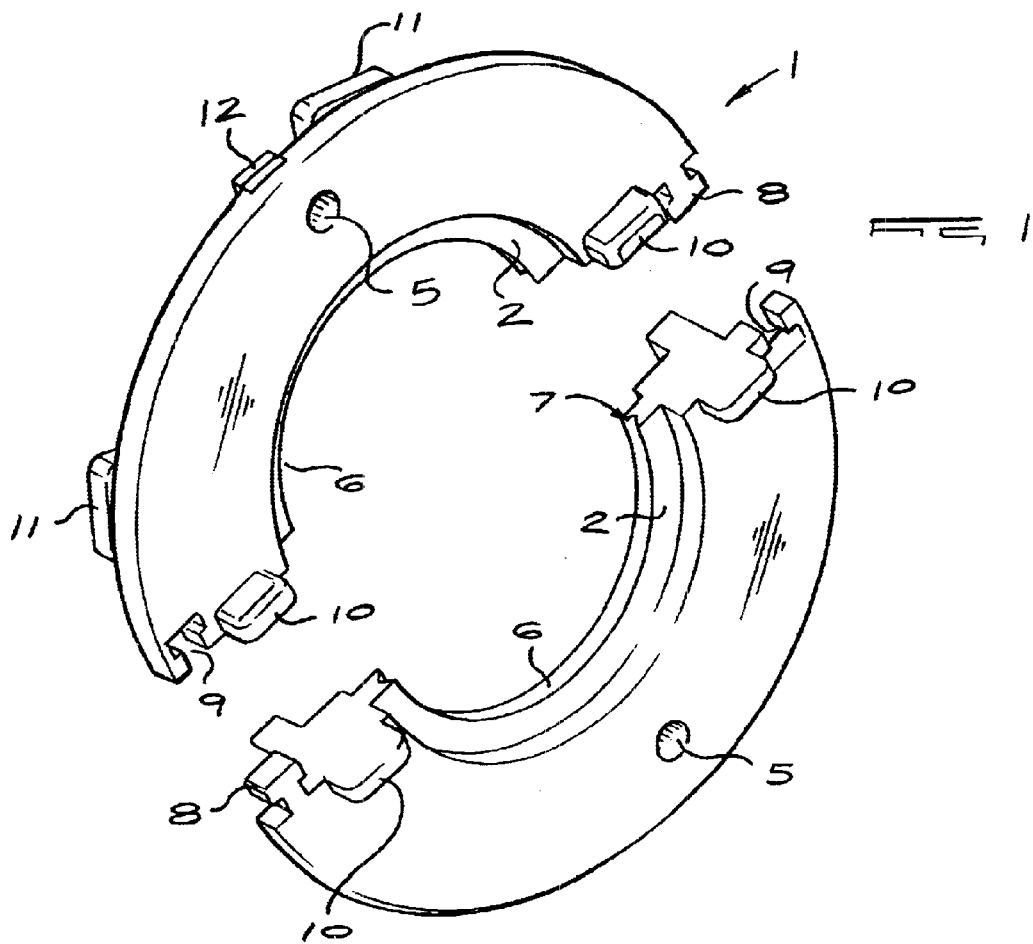
FIG. 1 is a perspective view of a first side bearing maintenance accessory.
Figure 2:
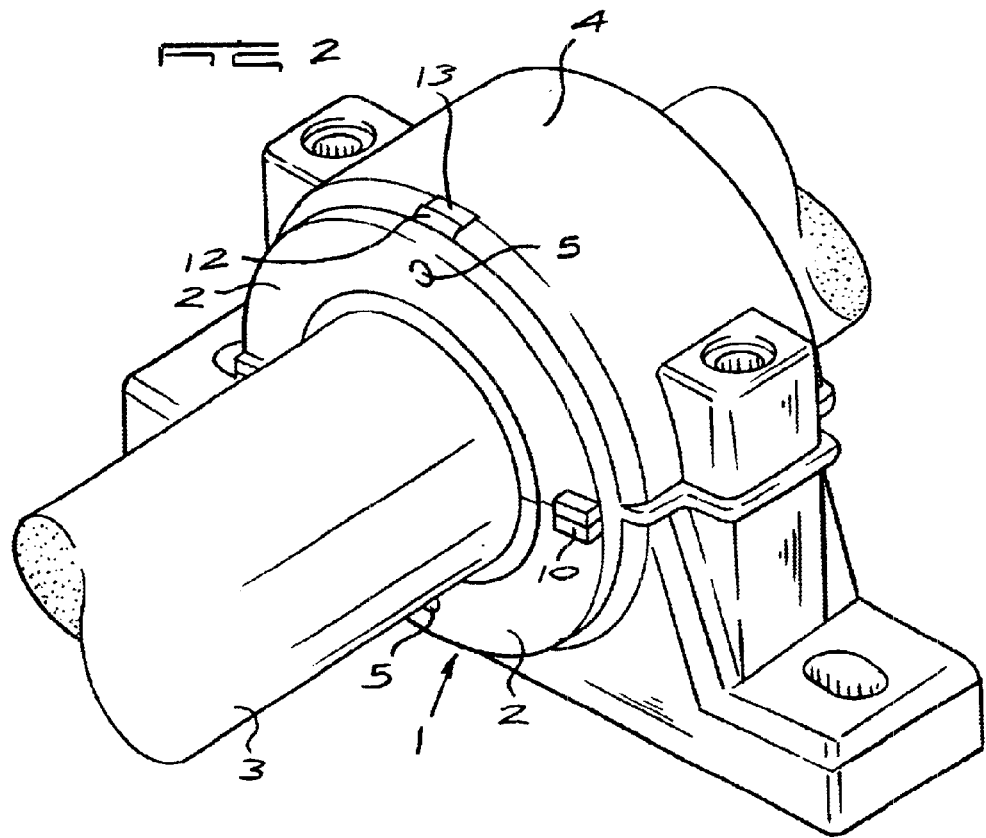
FIG. 2 is a perspective view of the accessory in FIG. 1 in use on a shaft and engaged with a pedestal bearing housing.

A bearing maintenance accessory (1) is shown in FIGS. 1 and 2 and is an annular manifold which Is radially split to form two equal parts (2). The accessory (1) Is shaped to be a sliding fit over a shaft (3) to locate snugly against a pedestal bearing housing (4) about the shaft (3).

Each part (2) of the manifold has an inlet (5) which is In flow communication through a number of flow passages (not shown) within the thickness of the manifold, with a series of longitudinally directed nozzle (not shown). The nozzles form outlets on a first side of the manifold.

The inner periphery (6) of each part is grooved as indicated at (7) so that a pair of narrow ribs are provided which contact the shaft (3) and form a reasonable seal therewith during cleaning of a bearing.

Each manifold part (2) has interlocking formations which include a shaped tongue (8) at one end and a complementary shaped groove (9) at the other end. The tongue (8) and groove (9) are shaped for sliding engagement with the appropriate engagement formation on the other manifold part. In this way the two parts can be placed around opposite sides of the shaft and be interlocked by relative longitudinal movement on the shaft. The connected parts can then be moved in unison along the shaft.

Projections (10) extend from the manifold parts (2) at each end on the inlet side which overlap when the parts are interlocked and these projections facilitate manipulation of the accessory (1) into and out of Its operative position.

Bearing housing engagement formations to retain the manifold in its operative position include stepped lugs (11). The lugs (11) are stepped to be spaced from the first side of the manifold. The lugs (11) are shaped to enter into openings (not shown) In the end of the housing (4) and on rotation of the accessory (1) the lugs will engage In slots in the housing extending circumferentially from the openings and so hold the first side of the manifold against the face of the housing. The lugs (11) and slots thus form a bayonet-type fitting.

Alternatively, the lugs may be inserted through openings in the housing and engage the inner face of a flange provided on the housing upon turning of the manifold.

To retain the manifold In an operative position, the engagement formations Include at least one resilient clip (12) which projects from the periphery of the first side of the manifold between the lugs (11). The clip (12) engages in a notch (13) provided therefore in the bearing housing when the lugs (11) are operatively engaged In the housing.

Figure 4:
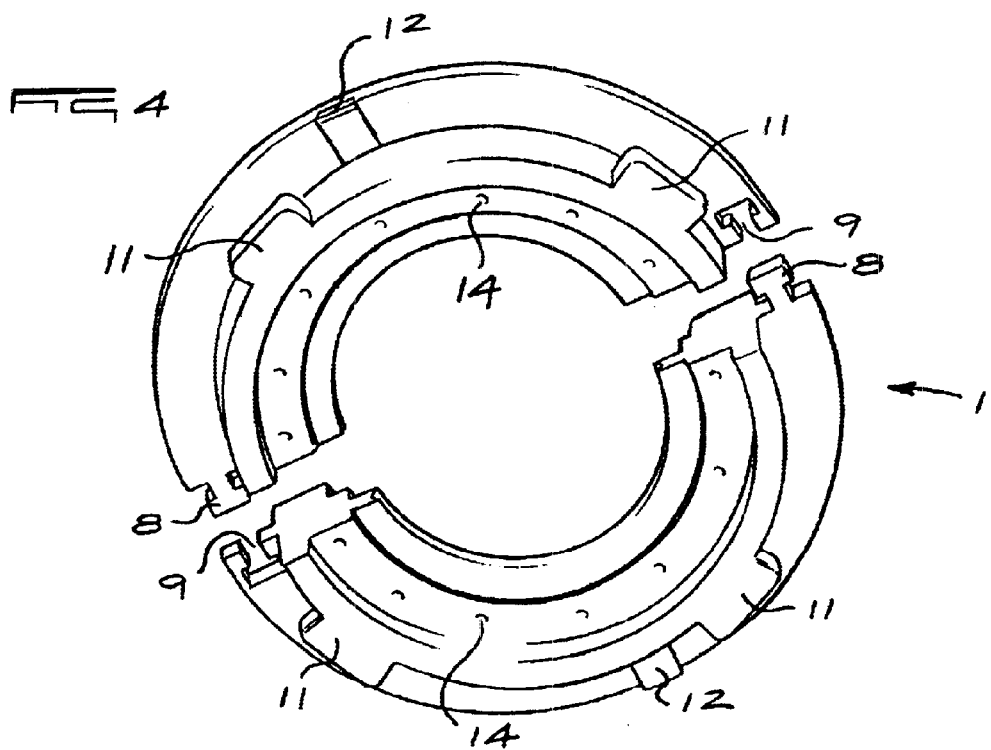
FIG. 4 Is a perspective view of an outlet side of a bearing maintenance acessory.

In use, bearing seal assemblies such as those shown in FIG. 4 used for the bearings on the shaft (3) are removed from both ends of the housing (4). These seals are similarly engaged with the housing as described above for the manifold. The accessory (1) is split and each half (2) placed over the shaft (3). The halves (2) are then secured together by sliding the interlocking tongues (7) and grooves (8) into engagement. Hereafter the accessory (1) Is slid along the shaft and operatively engaged with the housing as above described.

Figure 3:
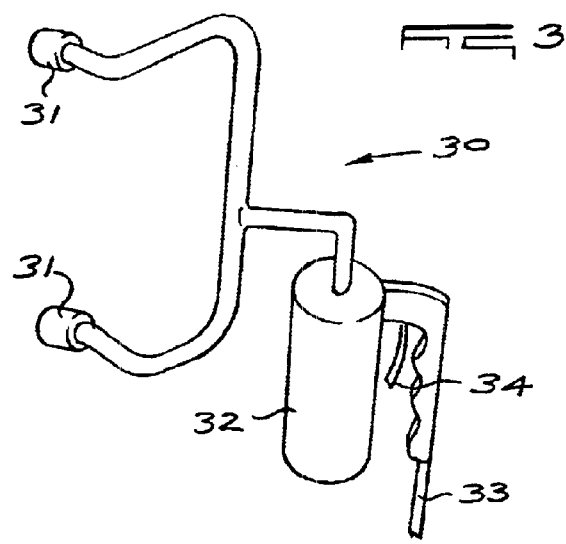
FIG. 3 is a perspective view of a solvent gun.

A cleaning solvent is then forced through the outlet onto the bearings (not shown). As shown in FIG. 3, a solvent gun (30) is provided for this purpose. The gun (30) has a pair of outlets (31) which respectively locate in the inlet openings (5) and communicate with a solvent filled reservoir (32). Compressed air Is fed via a hose (33) into the reservoir (32) to force the solvent through the outlets (31). Flow of compressed air is conveniently controlled through a trigger mechanism (34).

The solvent Is thus forced through the Inlets (5) and respective flow passages and through outlets (not shown) in an even manner onto the bearings (not shown). The solvent is allowed to flow out of the housing through the opening left by the removal of the seal at the opposite end of the bearing housing to which the maintenance accessory is secured.

When cleaning is complete, the bearings can be lubricated through the openings using an appropriate grease gun. Alternatively, the accessory can be removed and grease applied in conventional fashion. Removal of the accessory Is accomplished by releasing the resilient tongues (10) out of engagement with the notches (11) (conveniently by means of a screw driver) and then reversing the fitting procedure described above.

A cost and time effective method of cleaning bearings Is thus provided which has the added advantage that rotation of the shaft need not be stopped to perform cleaning as the top of the pedestal housing does not have to be removed during the maintenance procedure.

It will be appreciated however, that many other embodiments of a cleaning accessory exist which fall within the scope if the invention especially as regards the configuration thereof. For example, the accessory need not be attached to the housing in the manner described but could be secured thereto by mechanical fasteners or even by providing a screw threaded connection. Any suitable number of outlets can be provided and these could simply be longitudinally extending holes drilled into the accessory. Clearly, the shape of the accessory will differ to fit the particular configuration of shaft and housing.

What is claimed is:

1. A bearing maintenance accessory for a bearing located on a shaft within a bearing housing comprising:
   an annular manifold split into at least two parts;
   each part having interlocking formations for releasably interlocking the parts together about a shaft; and
   each part of the manifold having an inlet in flow communication with an outlet through a flow passage for forcing a fluid through the manifold;
   a side of the manifold having the an outlet is engageable against a face of the housing;
   the manifold including lugs which are spaced from the manifold parts and are engageable in slots provided in the housing.

2. A bearing maintenance accessory as claimed in claim 1 in which an Inner periphery of the manifold is grooved to form seal ribs which engage on the shaft.

3. A bearing maintenance accessory for a bearing located on a shaft within a bearing housing comprising;
   an annular manifold split into at least two parts;
   each part having, interlocking formations for releasably interlocking the parts together about a shaft; and
   each part of the manifold having an inlet in flow communication with an outlet through a flow passage for forcing a fluid through the manifold;
   a side of the manifold having an outlet is engageable against a face of the housing;
   the manifold including at least one resilient clip releasably engageable in a notch in the face of the housing.

4. A bearing maintenance accessory as claimed in claim 3 in which an inner periphery of the manifold is grooved to form seal ribs which engage on he shaft.

5. A bearing maintenance accessory for cleaning a grease lubricated bearing located on a shaft and within a bearing housing, the accessory comprising:
   an annular manifold radially split into two substantially equal parts having releasably interlocking formations for interlocking the parts together about the shaft adjacent the housing;
   an outlet side of the manifold being releasably engageable against a face of the housing by lugs extending from the manifold parts and engageable with the housing; and
   each part of the manifold having an Inlet for cleaning fluid in flow communication with an outlet nozzle on the outlet side of the manifold, the nozzle being constructed to direct the cleaning fluid into the bearing.

6. A bearing maintenance accessory as claimed in claim 5 in which an inner periphery of the manifold is grooved to form seal ribs which engage on the shaft.

7. A method of cleaning a pair of bearings within a bearing housing comprising the steps of interlocking two parts of an annular manifold about a shaft, engaging the interlocked parts with a bearing housing to hold a side of the manifold having an outlet against a face of the housing, and forcing a cleaning fluid into an inlet for each of the parts of the manifold and out through the outlet on the manifold into a bearing located in the housing.

* * * * *